US009208057B2

(12) United States Patent
Valdiviezo Basauri et al.

(10) Patent No.: US 9,208,057 B2
(45) Date of Patent: *Dec. 8, 2015

(54) EFFICIENT MODEL CHECKING TECHNIQUE FOR FINDING SOFTWARE DEFECTS

(71) Applicant: Oracle International Corporation, Redwood City, CA (US)

(72) Inventors: Manuel Javier Valdiviezo Basauri, Brisbane (AU); Cristina N. Cifuentes, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/258,902

(22) Filed: Apr. 22, 2014

(65) Prior Publication Data
US 2014/0229922 A1    Aug. 14, 2014

Related U.S. Application Data

(63) Continuation of application No. 13/046,598, filed on Mar. 11, 2011, now Pat. No. 8,732,669.

(51) Int. Cl.
*G06F 9/44* (2006.01)
*G06F 11/36* (2006.01)
*G06F 9/45* (2006.01)

(52) U.S. Cl.
CPC .............. *G06F 11/3608* (2013.01); *G06F 8/41* (2013.01)

(58) Field of Classification Search
CPC ........................................................ G06F 9/44
USPC ................................... 717/124, 126, 130–133
See application file for complete search history.

(56) References Cited

U.S. PATENT DOCUMENTS 5,129,077 A * 7/1992 Hillis .............................. 712/13
5,490,260 A * 2/1996 Miller et al. .................. 711/100
7,043,505 B1 * 5/2006 Teague et al. ..................... 1/1

OTHER PUBLICATIONS

Valdiviezo, "Detecting Deadlock using Model Checking", Oct. 30, 2009.*
Harrold et al, "Notes on Representation and Analysis of Software", Dec. 31, 2002.*

(Continued)

*Primary Examiner* — Chat Do
*Assistant Examiner* — Jae Jeon
(74) *Attorney, Agent, or Firm* — Osha Liang LLP

(57) ABSTRACT

A method for detecting defects in a computer program. The method steps include obtaining source code and a potential defect definition; identifying, based on the potential defect definition, a set of program objects associated with a potential defect in the source code; extracting an executable program slice having the potential defect from the source code; generating, by a processor, an abstracted model of the program slice by: modeling, using data abstraction, the set of program objects as data-abstracted variables, identifying, within the program slice, a set of control statements including predicates necessary for evaluating the set of control statements, modeling, using predicate abstraction, the predicates as predicate-abstracted Boolean variables, and creating, based on the data-abstracted variables and the predicate-abstracted Boolean variables, a finite state machine (FSM) model of the program slice; and identifying an error state of the FSM indicating an occurrence of the potential defect within the program slice.

17 Claims, 6 Drawing Sheets

(56) References Cited

OTHER PUBLICATIONS

Cherem, "Practical Memory Leak Detection using Guarded Value-Flow Analysis", Jun. 11-13, 2007.*
Stoller, S., "Software Model Checking: Where It Is and Where It's Headed," Software Testing Track of the 2005 Haifa Verification Conference, Haifa, Israel, Nov. 2005, 36 pages.
Baier, C. and Katoen, J.P., "Principles of Model Checking: 1.2 Characteristics of Model Checking," Cambridge, Mass.: The MIT Press, May 2008, 4 pages.
Chaki, S. et al., "Automated, Compositional and Iterative Deadlock Detection," 2nd ACM and IEEE International Conference on Formal Methods and Models for Co-Design (MEMOCODE), San Diego, California, Jun. 2004, 10 pages.
Rabinovitz, I. and Grumberg, O., "Bounded Model Checking of Concurrent Programs," 17th International Conference on Computer Aided Verification (CAV), Edinburgh, Scotland, Jul. 2005, 14 pages.
Hatcliff, J. and Dwyer, M. "Using the Bandera Tool Set to Model-Check Properties of Concurrent Java Software," 12th International Conference on Concurrency Theory (CONCUR), Aalborg, Denmark, Aug. 2001, 20 pages.
Ball, T. et al., "Automatic Predicate Abstraction of C Programs," ACM SIGPLAN Conference on Programming Language Design and Implementation (PLDI), Snowbird, Utah, Jun. 2001, 11 pages.
Henzinger, T. et al., "Software Verification with BLAST," 10th SPIN Workshop on Model Checking Software, Portland, Oregon, May 2003, 5 pages.
Henzinger, T. et al., "Lazy Abstraction," 29th ACM SIGPLAN-SIGACT Symposium on Principles of Programming Languages (POPL), New York, New York, Jan. 2002, 13 pages.
Clarke, E. et al., "A Tool for Checking ANSI-C Programs," 10th International Conference on Tools and Algorithms for the Construction and Analysis of Systems (TACAS), Barcelona, Spain, Mar. 2004, 9 pages.
Vorobyov, K. and Krishnan, P., "Comparing Model Checking and Static Program Analysis: A Case Study in Error Detection Approaches," 10th International Conference on Tools and Algorithms for the Construction and Analysis of Systems (TACAS), Barcelona, Spain, Mar. 2004, 7 pages.
Dwyer, M.B. et al., "Tool-Supported Program Abstraction for Finite-State Verification," 23rd International Conference on Software Engineering (ICSE), Toronto, Canada, May 2001, 11 pages.
Anderson, L.O., "Program Analysis and Specialization for the C Programming Language," PhD Thesis, Univeristy of Copenhagen, DIKU, May 1994, 43 pages.
Whaley, J. and Lam, M.S., "Cloning-Based Context-Sensitive Pointer Alias Analysis Using Binary Decision Diagrams," Conference on Programming Language Design and Implementation (PLDI), Washington, D.C., Jun. 2004, 14 pages.
Lhotak, O. and Hendren, J., "Context-Sensitive Points-To Analysis: Is It Worth It?," 15th International Conference on Compiler Construction (CC), Vienna, Austria, Mar. 2006, 16 pages.
Milanova, A. et al., "Parameterized Object Sensitivity for Points-To Analysis for Java," ACM Transactions on Software Engineering and Methodology, vol. 14, No. 1, Jan. 2005, 41 pages.
Cifuentes, C. and Scholz, B., "Parfait—Designing a Scalable Bug Checker," Static Analysis Workshop (SAW), Tucson, Arizona, Jun. 2008, 8 pages.
Valdiviezo, M., "Detecting Deadlock Using Model Checking," Thesis, University of Queensland, Queensland, Australia, Oct. 2009, 37 pages.
Harrold, M. et al., "Notes on Representation and Analysis of Software," Dec. 31, 2002, 16 pages.
Cherem, S. et al., "Practical Memory Leak Detection Using Guarded Value-Flow Analysis," PLDI '07, San Diego, California, Jun. 11-13, 2007, 12 pages.

* cited by examiner

EFFICIENT MODEL CHECKING TECHNIQUE FOR FINDING SOFTWARE DEFECTS

CROSS-REFERENCE TO RELATED APPLICATIONS

This application is a continuation application of U.S. patent application Ser. No. 13/046,598 filed Mar. 11, 2011, and entitled "EFFICIENT MODEL CHECKING TECHNIQUE FOR FINDING SOFTWARE DEFECTS." Accordingly, this application claims benefit of U.S. patent application Ser. No. 13/046,598 under 35 U.S.C. §120. U.S. patent application Ser. No. 13/046,598 is hereby incorporated in its entirety.

BACKGROUND

With the advent of agile software engineering methodologies and rapid development lifecycles, software quality assurance has proven to be a daunting task. Quality assurance tools such as bug-checkers and software model checkers play an important role in maintaining software quality.

Model checking (MC) is a formal methods technique used for the verification of hardware and software systems. Model checking algorithmically verifies behaviors of a system against one or more pre-defined properties or defect types. These systems are commonly represented as finite-state machines (FSM). Systems may be abstracted as finite-state machines so they can be tested in a mathematical and concrete fashion whereas properties of the system are sometimes expressed in Linear Temporal Logic (LTL) or Computation Tree Logic (CTL) formulas. A Software Model Checker (SMC) may be used to perform algorithmic verification of the FSM.

In a software example, a bug-checking tool builds a model to represent a given software program. This model may be an abstraction depicting the behavior of the software program. An SMC may then check the model against a specification including pre-defined error conditions and program properties. Based on the specification, the SMC is able to verify whether the system satisfies a specified property (e.g., an error state). Due to the combinatorial nature of model checking algorithms, the memory and processing power required to complete an analysis of the model can increase exponentially with the number of states.

SUMMARY

In general, in one aspect, the invention relates to a method for detecting defects in a computer program. The method steps include obtaining, by a processor, source code and a potential defect definition; identifying, based on the potential defect definition, a set of program objects associated with a potential defect in the source code; extracting an executable program slice having the potential defect from the source code; generating, by a processor, an abstracted model of the program slice by: modeling, using data abstraction, the set of program objects as data-abstracted variables that represent a reduced set of possible states of the set of program objects, identifying, within the program slice, a set of control statements including predicates necessary for evaluating the set of control statements, modeling, using predicate abstraction, the predicates as predicate-abstracted Boolean variables that represent a reduced set of possible states of the set of control statements, and creating, based on the data-abstracted variables and the predicate-abstracted Boolean variables, a finite state machine (FSM) model of the program slice; and identifying an error state of the FSM indicating an occurrence of the potential defect within the program slice.

In general, in one aspect, the invention relates to a computer-readable storage medium storing a instructions for detecting defects in a computer program. The instructions include functionality to: obtain source code and a potential defect definition; identify, based on the potential defect definition, a set of program objects associated with a potential defect in the source code; extract an executable program slice having the potential defect from the source code; generate an abstracted model of the program slice by: modeling, using data abstraction, the set of program objects as data-abstracted variables that represent a reduced set of possible states of the set of program objects, identifying, within the program slice, a set of control statements including predicates necessary for evaluating the set of control statements, modeling, using predicate abstraction, the predicates as predicate-abstracted Boolean variables that represent a reduced set of possible states of the set of control statements, and creating, based on the data-abstracted variables and the predicate-abstracted Boolean variables, a finite state machine (FSM) model of the program slice; and identify an error state of the FSM indicating an occurrence of the potential defect within the program slice.

In general, in one aspect, the invention relates to a system for detecting defects in a computer program. The system includes: a processor; a defect analysis tool executing on the processor and configured to obtain source code and a potential defect definition, identify, based on the potential defect definition, a set of program objects associated with a potential defect in the source code; extract an executable program slice having the potential defect from the source code; a model generator executing on the processor and configured to generate an abstracted model of the program slice by: modeling, using data abstraction, the set of program objects as data-abstracted variables that represent a reduced set of possible states of the set of program objects, identifying, within the program slice, a set of control statements including predicates necessary for evaluating the set of control statements, modeling, using predicate abstraction, the predicates as predicate-abstracted Boolean variables that represent a reduced set of possible states of the set of control statements, and creating, based on the data-abstracted variables and the predicate-abstracted Boolean variables, a finite state machine (FSM) model of the program slice; and a model checker executing on the processor and configured to identify an error state of the FSM indicating an occurrence of the potential defect within the program slice.

Other aspects of the invention will be apparent from the following description and the appended claims.

DETAILED DESCRIPTION

Figure 1:
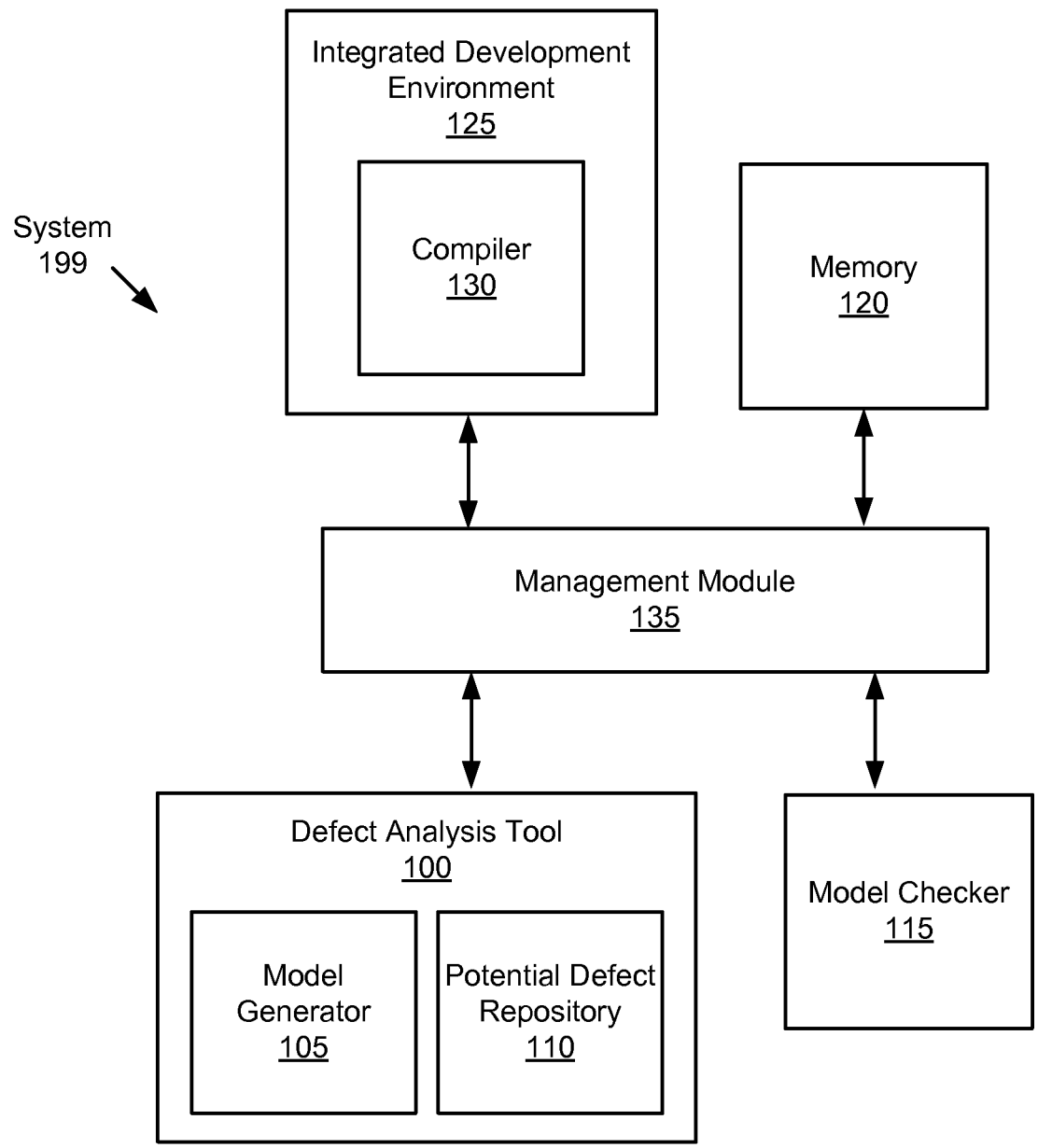
FIG. 1 depicts a schematic block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for detecting defects (i.e., bugs) in source code. In general, embodiments of the invention generate a finite state machine (FSM) to model a subset of statements corresponding to a potential defect in source code. Specifically, the FSM may be generated using predicate abstraction and/or data abstraction in order to model a reduced set of states of the source code. The potential defect may correspond to a specific instance of a program object. The FSM is then analyzed by a model checker and one or more error states of the FSM depicting an occurrence of the potential defect may be identified.

For purposes of this disclosure, source code may refer to any set of statements written in one or more programming languages (e.g., C/C++, Java™, Python, Ruby, Personal Home Page (PHP) scripting language, Practical Extraction and Report Language (Perl), etc.). A statement may be any instruction, declaration, operation, expression, and/or recognizable element of source code in accordance with one or more embodiments of the invention. Examples of programming languages may include compiled languages as well as interpreted languages of any order. In one or more embodiments of the invention, source code may include assembly language or bytecode. The source code may include a fully functional program and/or any executable subset of a program such as a function, class, library, declaration, user-defined type, and/or any code segment including one or more syntactically verifiable statements. The source code may reference one or more outside classes, objects, files, libraries (e.g., a dynamically linked library) and/or application programming interfaces (APIs).

For purposes of this disclosure, an "executable" set of source code may refer to any source code that is syntactically verifiable. Source code may be syntactically verifiable if the source code follows the syntax of the programming language in which the source code is written. In one or more embodiments of the invention, source code is said to be "executable" if the source code's conversion to an executable program is trivial. Conversion to an executable program is trivial when the source code does not have any syntactic errors, may be compiled/interpreted successfully, and/or may be executed as a standalone program or as part of an existing program. Examples of executable source code may include one or more snippets (i.e., portions) of source code which are executable if one or more necessary libraries and/or formal structure (e.g., a "main" function, etc) are included.

For purposes of this disclosure, a program object may be any element of source code including, but not limited to, a statement, a data structure, control structure, variable, object, memory allocation, thread, file, library, instruction, module, type, structure, value, and/or attribute. For example, a Hashmap object within source code may be a program object.

For purposes of this disclosure, a control statement (i.e., control flow statement) is a source code statement that, when executed (i.e., evaluated), determines an execution path of the program among two or more alternatives. In one or more embodiments of the invention, execution of the control statement may lead to executing a set of statements only if some condition is met (i.e., a conditional), a branch or jump to one or more different statements, executing one or more external statements (e.g., a subroutine) and then returning, executing a set of statements one or more times until some condition is met (i.e., a loop), and/or halting the program. Thus, in one or more embodiments of the invention, the control statement may include one or more conditional statements and/or may evaluate to a Boolean result (i.e., TRUE or FALSE).

For purposes of this disclosure, a defect may be any type of computer coding error associated with one or more program objects. For example, a defect may cause an unintended state of a computer program and/or computer system executing the computer program. Examples of a defect may include but are not limited to a security defect, an arithmetic defect (e.g., division by zero, arithmetic underflow or overflow, loss of arithmetic precision due to rounding, etc), a syntax defect (e.g., use of the assignment operator instead of the equality operator, etc), a multi-threading programming defect (e.g., deadlock, race condition, concurrency error in critical/atomic section, mutual exclusion, etc) and any other type of software defect as commonly known in the art.

For purposes of this disclosure, a potential defect may be any unverified defect (i.e., a defect that may or may not exist) within source code. In one or more embodiments of the invention, an occurrence (i.e., reproduction) of the potential defect may be identified within the source code. If an occurrence of the potential defect is identified, the potential defect is then referred to as a real defect (i.e., defect). If it is confirmed that an occurrence of the potential defect does not exist, the potential defect may be referred to as a non-defect, non-bug, or not a defect. In one or more embodiments of the invention, if a potential defect is confirmed to be a real defect or a non-defect, the potential defect is then deemed to be verified.

For purposes of this disclosure, a predicate may be an atomic formula or the negation of an atomic formula. In one or more embodiments of the invention, an atomic formula may include any formula and/or statement within the program slice composed solely of basic elements (i.e., data types, structures, and/or operators) of the programming language in which it is written. Atomic formulae may differ among various different programming languages and various different embodiments of the invention.

For purposes of this disclosure, a model may be any abstract or physical structure depicting behavior and/or states of a given set of source code. For purposes of this disclosure, a model object may be a component of a model. In one or more embodiments of the invention, a model object is a representation of the behavior of one or more program objects. Examples of model objects may include, but are not limited to, a model variable storing a value of a program variable, a graph node describing a state of one or more program objects, a description of an execution path of the source code, and/or any abstraction of a behavior, state, and/or attribute of one or more program objects.

FIG. 1 shows a system (199) in accordance with one embodiment of the invention. As shown in FIG. 1, the system has multiple components including a defect analysis tool (100), a model generator (105), a potential defect repository (110), a model checker (115), a memory (120), an integrated development environment (125), a compiler (130), and a management module (135). The components of the system may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the defect analysis tool (100) is a software application. The defect analysis tool (100) may be an application subroutine, a software module, a library, a job and/or any type of software component in accordance with one or more embodiments of the invention disclosed herein. For example, the defect analysis tool (100) may be a software application integrated within a compiler. Alternatively, the defect analysis tool (100) may be a hardware device, and/or a component of a hardware device.

In one or more embodiments of the invention, the defect analysis tool (100) includes functionality to obtain source code. In one or more embodiments of the invention, the defect analysis tool (100) is configured to receive the source code from a software development application. The defect analysis tool (100) may be operatively connected to one or more software applications including, but not limited to, a concurrent versioning system, a web-based applications development platform, a distributed database of managed source code, and/or any software application or device capable of storing and/or transferring source code.

In one or more embodiments of the invention, the defect analysis tool (100) includes a user interface. In one or more embodiments of the invention, the defect analysis tool (100) includes functionality to receive the source code from a user of the user interface. The user of the user interface may be an end user of a computer system, a software engineer, a designer, an applications developer, a system administrator, and/or any person or entity communicatively coupled with the defect analysis tool (100). In one or more embodiments of the invention, the defect analysis tool (100) is configured to import the source code periodically for batch processing of a managed code base.

In one or more embodiments of the invention, the defect analysis tool (100) includes functionality to obtain one or more potential defect definitions. The defect analysis tool (100) may obtain the one or more potential defect definitions from a data repository (e.g., a hard disk drive and/or a relational database), a software application communicatively connected to the defect analysis tool (100), a user of the defect analysis tool (100), an author of the source code, and/or any authorized entity in accordance with one or more pre-defined security credentials. Alternatively or additionally, the defect analysis tool (100) may be pre-configured or designed with the one or more potential defect definitions and/or security credentials.

In one or more embodiments of the invention, the defect analysis tool (100) includes functionality to parse source code into a set of logical tokens and then analyze the tokens according to syntactical rules of the programming language in which the source code is written.

In one or more embodiments of the invention, the defect analysis tool (100) includes functionality to identify a potential defect within source code based on a potential defect definition. In one or more embodiments of the invention, the defect analysis tool (100) is configured to parse and scan the source code in order to identify one or more potential defects. The defect analysis tool (100) may match one or more statements within the source code to a search criteria defined by the potential defect definition. The search criteria may include a usage of one or more program objects within the source code (i.e., any access and/or modification of a program object by a statement within source code).

Examples of search criteria may include a regular expression, syntactical element of a programming language, a library name, a function name, an operation (e.g., assignment, arithmetic operation, function call, declaration, definition, etc.) and/or any sequence of text characters identifiable within the source code. For example, when identifying a potential buffer overflow defect, the defect analysis tool (100) may identify indices to a character array.

In another example, a potential defect definition may identify a character pointer assignment. Examples of statements identified by a search criteria may include but are not limited to a memory allocation followed by an assignment statement, invocation of a subroutine, a pointer assignment, dereferencing of a pointer variable, and/or any other usage of one or more program objects within source code.

In another example of search criteria, a shared resource used by two or more threads is an indicator of a potential synchronization deadlock defect. In this example, a first thread, a second thread, and a shared resource (e.g., a printer) are program objects. In one or more embodiments of the invention, each potential defect is analyzed separately. Thus, continuing the example, the potential synchronization deadlock defect refers to the potential for the first and second threads to deadlock (rather than all potential synchronization deadlock defects identified by the potential defect definition).

In one or more embodiments of the invention, the defect analysis tool (100) includes functionality to identify, based on the potential defect definition, one or more program objects necessary for analysis of the potential defect. In one or more embodiments of the invention, the one or more program objects may include any program object which can potentially lead to an occurrence of the potential defect.

For example, the potential defect may be a null pointer dereference. In this example, the program object is a pointer variable and the potential defect definition's search criteria identifies a pointer dereference operation. Thus, in the example, the defect analysis tool (100) searches for one or more pointer dereference operations. If the defect analysis tool (100) finds one or more pointer dereference operations within the source code, then the potential null pointer dereference defect is determined to exist. Continuing the example, the source code includes a control statement. The control statement is a program object which is necessary for analysis of the potential null pointer dereference defect because at least one branch of the control statement leads to the pointer dereference operation. Thus, depending on an evaluation of the control statement, the dereference operation may be executed. In this example, the defect analysis tool (100) is configured to detect that the control statement affects the possibility of producing an occurrence of the potential defect (i.e., causing a null pointer dereference).

In one or more embodiments of the invention, the defect analysis tool (100) includes functionality to sort a list of potential defects (not shown) based on one or more sorting criteria. Examples of sorting criteria may include, but are not limited to, size of an analysis algorithm, growth rate of an analysis algorithm, number of operations required, resource usage requirement (e.g., time and number of resources), analysis run time, and/or assigned priority of each potential defect in the list. In one or more embodiments of the invention, the defect analysis tool (100) is configured to sort the list in increasing or decreasing order of the sorting criteria. For example, when sorted in increasing order of analysis run time, the potential defect with the shortest analysis run time may be analyzed first by the defect analysis tool (100). In one or more embodiments of the invention, the defect analysis tool (100) is pre-configured to assign a priority for each potential defect or to receive an assignment of priorities from a user and/or authorized entity. In one or more embodiments of the invention, the defect analysis tool (100) is configured to receive a pre-sorted list of one or more potential defects from a user and/or authorized entity.

In one or more embodiments of the invention, the defect analysis tool (100) includes functionality to extract a program slice (i.e., a subset) from the source code having the potential defect. The program slice may be a contiguous or non-contiguous subset of the source code. In one or more embodiments of the invention, the program slice is executable. In one or more embodiments of the invention, the defect analysis tool (100) is configured to extract the program slice after identifying the potential defect within the source code.

In one or more embodiments of the invention, the program slice includes all statements from the source code that have the potential to cause, directly or indirectly, an occurrence of the potential defect to be produced and/or are necessary for maintaining executability of the program slice. For example, if a potential defect is identified as being a memory leak associated with memory allocated for a pointer variable, the program slice includes any manipulation of the pointer variable having the potential to cause an occurrence of the potential memory leak (i.e., cause the memory leak to occur). Also, in the example, any control statements or other statements that may prevent memory de-allocation, cause a premature return statement to be executed, and/or otherwise cause a leak associated with the allocated memory are included in the program slice. In one or more embodiments of the invention, any program objects identified by a potential defect definition and/or any statements modifying said program objects are included in the program slice. In one or more embodiments of the invention, rather than being extracted by the defect analysis tool (100), the program slice is pre-defined by an associated software application, user, and/or authorized entity. In one or more embodiments of the invention, the defect analysis tool (100) is configured to receive the pre-defined program slice.

In one or more embodiments of the invention, the defect analysis tool (100) includes functionality to verify a potential defect (i.e., confirm whether the potential defect is a real defect or a non-defect). The defect analysis tool (100) may extract a program slice from the source code and model the program slice using an FSM. In one or more embodiments of the invention, if an occurrence of the potential defect is identified within the source code, the potential defect is verified to be a real defect.

In one or more embodiments of the invention, the model generator (105) includes functionality to perform data abstraction on a program object within the program slice. Generally, data abstraction involves reducing a set of possible states for the program object. In one or more embodiments of the invention, a state of a program object may refer to a unique set of values and/or attributes of the program object which define a status of the program object during execution of the program slice. Data abstraction may involve modeling program behaviors which may lead to an occurrence of the potential defect in the program slice. In one or more embodiments of the invention, the model generator (105) is configured to perform data abstraction by excluding program behaviors (from the model) which do not have potential to cause an occurrence of the potential defect to be produced and/or which have no bearing on reproduction of the potential defect.

In one or more embodiments of the invention, the model generator (105) includes functionality to create one or more data-abstracted variables to model one or more program objects (e.g., data structures, control structures, variables, objects, parameters, etc.) within the program slice. In one or more embodiments of the invention, a data-abstracted variable is a model object, which is an abstraction of the one or more program objects within the program slice. The data-abstracted variable may model a subset of the potential states of the one or more program objects that have the potential to cause an occurrence of the potential defect in the program slice. In one or more embodiments of the invention, the model generator (105) is configured to create a set of potential values of the data-abstracted variable to represent such states. The data-abstracted variable may be initialized to a value of the set of potential values based on a first usage and/or instance of a corresponding program object within the program slice.

In one example, an integer value (X) is defined within the program slice. In the program slice, a control statement determines whether X is greater than zero and lower than ten. Using data abstraction, a corresponding data-abstracted variable $X_{abs}$ is created by the model generator (105). The set of potential values for $X_{abs}$ is the following reduced set of potential values for X: {"below1", "between1&9", "above9"}. As a result, within the model, $X_{abs}$ can only be assigned one of these values. Thus, the model represents the behavior of the control statement by checking whether $X_{abs}$ equals to "between1&9". In this manner, the number of potential states of the model is reduced since the set of values of the variable $X_{abs}$ is drastically decreased from those of the integer X (i.e., from infinity to three). In one or more embodiments of the invention, data-abstracted models are cheaper (i.e., less complex) to analyze than predicate-abstracted models.

In one or more embodiments of the invention, the model generator (105) includes functionality to identify a set of control statements within the program slice. The model generator (105) may include a set of syntactical rules of a programming language in which the program slice is written. Thus, in one or more embodiments of the invention, the model generator (105) is configured to use the syntactical rules of the programming language to identify the set of control statements. In one or more embodiments of the invention, the model generator (105) is configured to parse the source code into one or more tokens based on one or more structural elements of the programming language. A token may be a smallest element of recognizable syntax in the programming language. In one or more embodiments of the invention, the set of control statements may be identified based on a keyword search of the one or more tokens.

In one or more embodiments of the invention, the model generator (105) includes functionality to extract one or more predicates from the set of control statements. A predicate may be an attribute of a program object (e.g., a control statement) which evaluates to TRUE or FALSE. Thus, a predicate may be modeled as a Boolean variable. The following examples may be identified as predicates within one or more control statements of a program slice: "x==3", "f==NULL", "x<y", "x<=3", "x==y". In one or more embodiments of the invention, the model generator (105) is configured to extract only predicates whose value may lead to an occurrence of the potential defect in the program slice. Thus, in one or more embodiments of the invention, if a predicate's value is irrelevant to the potential defect, the model generator (105) does not extract the predicate from the program slice.

In one or more embodiments of the invention, the model generator (105) includes functionality to create, using data abstraction, a set of data-abstracted control variables to model the behavior of one or more predicates extracted from the set of control statements. In one or more embodiments of the invention, a data-abstracted control variable is a model object representing the states of one or more of the extracted predicates based on model data created using data abstraction. In one or more embodiments of the invention, the model generator (105) is configured to create, when possible, the data-abstracted control variables based on existing model data (without generating additional abstraction). Existing model data may include data-abstracted variables created to model one or more program objects other than the predicates from the set of control statements. Thus, in one or more embodiments of the invention, the data-abstracted control variables are created without generating additional abstraction from the program slice and/or are based solely on existing data-abstracted variables.

For the following example, consider the scenario in which the model generator (105) models a pointer variable (p) using data abstraction in order to check for potential memory leaks. In the example, the model generator (105) abstracts the states of the pointer p as three data-abstracted variables: virtual address, offset, and indirect reference. The potential value of the virtual address of p can equal a given memory allocation, NULL, or "unknown". The indirect reference variable identifies a pointer contained in the referenced memory (if one exists). The model generator (105), models the behavior of a control statement "if (p==NULL)", using data from the data-abstracted variables for p, since the relevant information is already known (i.e., whether p equals NULL). Conversely, continuing the example, it is not possible to model the control statement "if (X>2)" using data abstraction since the integer variable "X" is not being modeled and X's value is thus unknown to the model generator (105) without further abstraction. In one or more embodiments of the invention, control statements are modeled using data abstraction whenever evaluation of the control statements is possible based on existing model data (i.e., without additional abstraction).

In one or more embodiments of the invention, the model generator (105), includes functionality to create, using predicate abstraction, a set of predicate-abstracted Boolean variables to model the behavior of one or more predicates from the set of control statements. A predicate-abstracted Boolean variable is a model object representing the states (i.e., TRUE or FALSE) of one or more of the extracted predicates. In one or more embodiments of the invention, the model generator (105) is configured to use predicate abstraction when the data-abstracted model data is insufficient to evaluate the predicates. Thus, if one or more additional program objects need to be abstracted in order to evaluate a given predicate, the model generator (105) is configured to use predicate abstraction in one or more embodiments of the invention.

In one or more embodiments of the invention, the model generator (105) is operatively connected to a theorem prover (not shown). The theorem prover includes functionality to calculate how a statement alters the value of one or more Boolean predicates. In one or more embodiments of the invention, model generator (105) is configured to model these Boolean predicates as one or more data-abstracted control variables and/or predicate-abstracted Boolean variables. In one example, in order to verify that a program variable "a" is always positive, a predicate-abstracted Boolean variable "{a>0}" may be introduced. Accordingly, in this example, the program statement "a=7" is translated as "{a>0}=true".

In one or more embodiments of the invention, the model generator (105) includes functionality to generate a finite state machine (FSM) to model the program slice. In one or more embodiments of the invention, the FSM is generated based upon one or more model variables (i.e., data-abstracted variables, data-abstracted control variables, and/or predicate-abstracted Boolean variables). Accordingly, in one or more embodiments of the invention, the FSM is an abstraction of one or more behaviors of the program slice which have the potential to cause an occurrence of the potential defect. The FSM is composed of one or more states and one or more transitions between the states. Each state of the FSM represents a state of one or more model variables at a given point in the execution path of the program slice.

In one or more embodiments of the invention, model generator (105) is configured to process one or more statements in the program slice in order to generate one or more equivalent instructions in the FSM model (i.e., model instructions). A model instruction may be a description of one or more components (e.g., states, transitions, etc.) of the FSM and/or one or more model objects. The model generator (105) may be configured to write model instructions in any modeling language capable of representing an FSM in accordance with one or more embodiments of the invention (e.g., the Promela verification modeling language, etc.). In one or more embodiments of the invention, the FSM and all associated model data are defined within a set of model instructions generated from the program slice. Thus, in one or more embodiments of the invention, the model generator (105) is configured to process the program slice line by line and generate the FSM model of the program slice represented as one or more model instructions. In order to generate a model instruction, the model generator (105) may create one or more new model objects (e.g., data-abstracted variables, data-abstracted control variables, predicate-abstracted Boolean variables, FSM states/transitions, etc.) using data abstraction and/or predicate abstraction as necessary in accordance with one or more embodiments of the invention. The model generator (105) may also modify the state of one or more existing model objects in order to model the behavior of a statement within the source code. In one or more embodiments of the invention, if a model instruction cannot be generated for a statement within the program slice (e.g., because the statement is too complex), an empty model is returned so that the process ends.

In one or more embodiments of the invention, the potential defect repository (110) is configured to store potential defect definitions, model data, and/or program metadata corresponding to the program slice. The potential defect repository (110) may be implemented as a relational database, a hard disk drive, a networked array of storage devices, a software component (e.g., a data structure), a portion of a random access memory, and/or any physical or virtual storage device. Examples of model data may include data-abstracted variables, data-abstracted control variables, predicate-abstracted Boolean variables, FSMs, virtual memory models, abstraction types corresponding to one or more program objects, and/or any data necessary for modeling and/or checking of source code. Examples of program metadata may include one or more Makefiles, configuration files, project files, and/or data relating to defect analyses and/or potential defects. In one or more embodiments of the invention, the potential defect repository (110) is configured to store one or more potential defect definitions and/or defect analyses related to the potential defect definitions.

In one or more embodiments of the invention, a defect analysis is a method for analyzing a potential defect identified by the defect analysis tool (100) based on a potential defect definitions. A defect analysis may involve extracting a program slice from the source code and creating an FSM model of the program slice.

In one or more embodiments of the invention, the model checker (115) includes functionality to perform a verification of the FSM. The model checker (115) may test the states of the FSM and identify an error state. In one or more embodiments of the invention, the error state is a state of the FSM which represents an occurrence of the potential defect in the program slice (e.g., a counterexample). In one or more embodiments of the invention, the model checker (115) is configured to identify, based on the error state, one or more program paths (i.e., sequences of statements and/or states/values of program objects) which are capable of producing an occurrence of the potential defect. In one or more embodiments of the invention, the model checker (115) is configured to test only a subset of the states of the FSM for errors. For example, a program slice may contain a memory allocation which is tested for a memory leak defect. In the example, the model generator (105) passes an FSM model of the program slice to the model checker (115) which then proceeds to check only the end states of the FSM model for error conditions. Upon iterating through the end states, the model checker (115) finds allocated memory in one of the end states and designates the memory leak defect as a real defect. In one or more embodiments of the invention, the model checker (115) is an integrated part of the defect analysis tool (100).

In one or more embodiments of the invention, the integrated development environment (125) includes functionality to communicate with the model generator (105) and/or various other components of the system through the management module (135) (or directly). Thus, in one or more embodiments of the invention, the integrated development environment (125) is configured to obtain source code from a user. For example, the user may be a software tester, an engineer, an applications developer, an author of the source code, or any other user of the integrated development environment. In one or more embodiments of the invention, the integrated development environment (125) includes a graphical user interface configured to obtain input from the user. Thus, the user may write source code, initiate compilation/interpretation, define/modify/select one or more potential defect definitions, select one or more defect analyses, and/or initiate defect analysis through the graphical user interface.

In one or more embodiments of the invention, the integrated development environment (125) includes functionality to initiate one or more periodic defect analysis routines. The integrated development environment (125) may receive one or more defect analysis times from a user and/or may send instructions to the defect analysis tool (100) to perform defect analysis at the one or more defect analysis times. In one or more embodiments of the invention, the integrated development environment (125) receives a definition of the timing and/or scope of the defect analysis routine from the user. A defect analysis routine may include one or more potential defect definitions and/or defect analyses to be executed in the routine in accordance with one or more embodiments of the invention. In one or more embodiments of the invention, the defect analysis tool (100) is configured to receive the one or more potential defect definitions and/or defect analyses from the integrated development environment (125). The integrated development environment (125) may be communicatively coupled with a concurrent versioning system (CVS). Thus, in one or more embodiments of the invention, the defect analysis tool (100) receives instructions to initiate one or more defect analysis routines from the user of the integrated development environment (125). The one or more defect analysis routines may be executed against at least a portion of a code base of the CVS including multiple source code documents authored by one or more software developers.

In one or more embodiments of the invention, the integrated development environment (125) includes a compiler (130) configured to compile source code in one or more programming languages. In one or more embodiments of the invention, the model generator (105) utilizes the compiler (130) to extract executable program slices and/or compile/interpret program slices in order to verify that they are executable. In one or more embodiments of the invention, the model generator (105) is configured to submit one or more program slices to the compiler (130) in order to test whether the program slice and/or a subset of the program slice is executable and/or to perform one or more syntactic or compilation or interpretation checks. In one or more embodiments of the invention, the compiler (130) is integrated within the defect analysis tool (100) and is configured to identify source code statements, tokens, objects, variables and/or other program objects in response to a request from the defect analysis tool (100). The compiler (130) may also verify and/or output the scope and/or state of one or more program objects at any point in the execution path of a given set of source code. In one or more embodiments of the invention, the compiler (130) is an interpreter for an interpreted programming language. Thus, in various embodiments of the invention, compilation steps within this disclosure may be performed by the interpreter for any source code written in an interpreted programming language (e.g., PHP, Hypertext Markup Language (HTML), Perl, etc.).

In one or more embodiments of the invention, the defect analysis tool (100) is a standalone analysis tool and is not communicatively coupled to the integrated development environment (125) or the compiler (130). For example, the defect analysis tool (100) may be a utility which is executable by one or more commands in a command line interface.

In one or more embodiments of the invention, the memory (120) may be a Random Access Memory (RAM), a hardware cache, flash memory, and/or any other type of volatile or non-volatile storage medium. Further, the memory (120) may include functionality to store model data (i.e., objects, states, variables, etc.) during evaluation and/or generation of the model. In one or more embodiments of the invention, if the size of the model grows beyond a pre-defined threshold defined by a user or other entity, the model generator (105) is configured to cancel the modeling process and produce an error message. The pre-defined threshold may be defined by a user within a graphical user interface of the defect analysis tool (100). Thus, problems associated with state explosion may be mitigated by tracking the contents and size of the memory (120), in one or more embodiments of the invention. The virtual memory space may be constructed by the model generator (105) within the memory (120) for the purpose of generating and/or verifying the FSM model. In this way, virtual memory "values" corresponding to one or more model objects generated by the model generator (105) may be utilized by the model checker (115) and/or compiler (130).

In one or more embodiments of the invention, the management module (135) provides interoperability, format conversion and/or cross-compatibility among the various components of the system (199), as illustrated in an exemplary form in FIG. 1. For example, the management module (135) may transfer data between the model generator (105) and the model checker (115), and/or vice-versa. Furthermore, the management module (135) may be used as a seamless integration point between any combination of components both within the system (199) and outside of the system.

In one or more embodiments of the invention, various components of the system (199) are optional and/or may reside within other components or may be located on one or more physical devices. In one or more embodiments of the invention, the defect analysis tool (100), model generator (105) and the model checker (115) reside within the integrated development environment (125) as features of a bug-checking tool. Various other arrangements and combinations may also exist.

Figure 2:
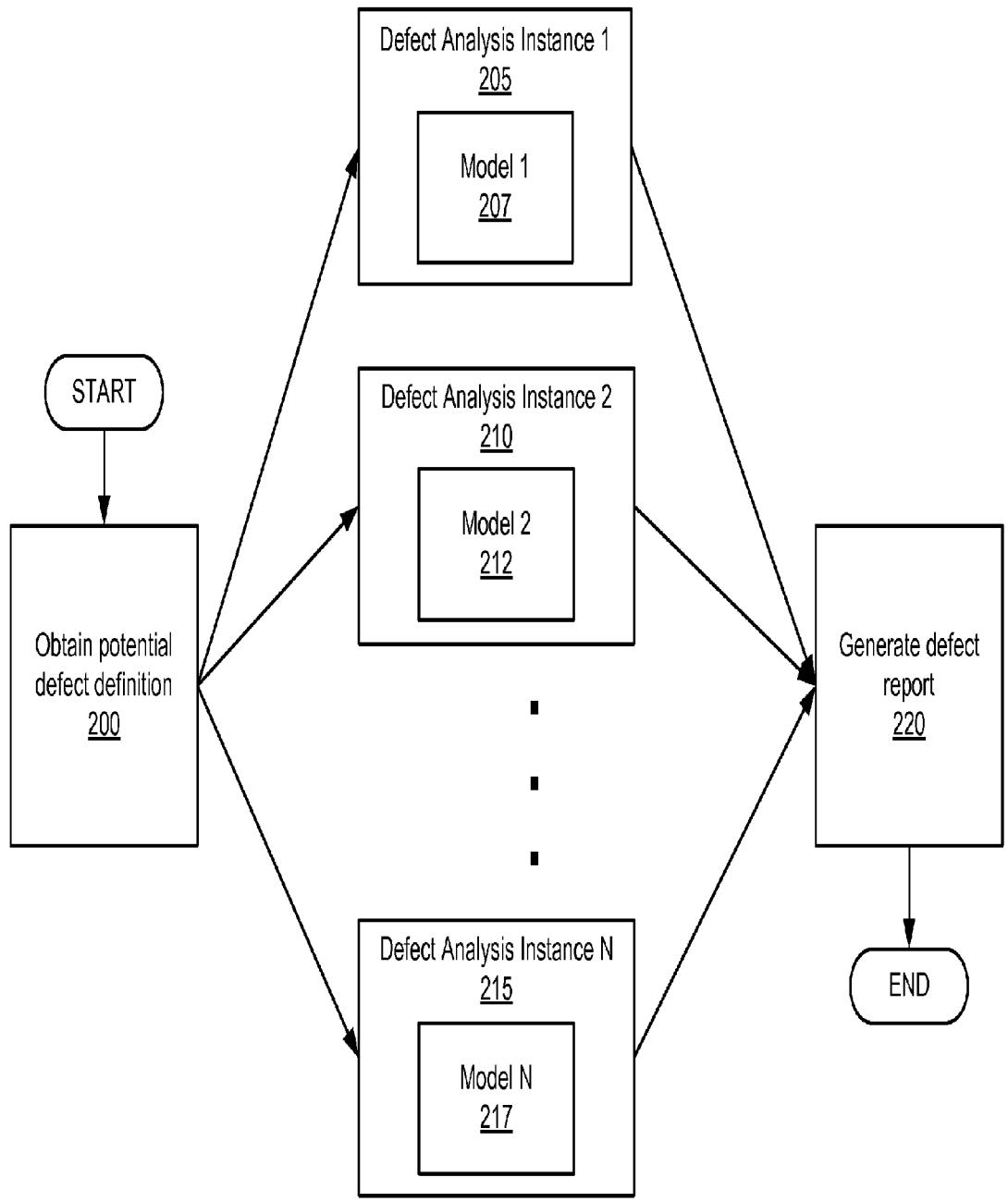
FIGS. 2, 3, and 4 depict flowcharts in accordance with one or more embodiments of the invention.

FIG. 2 shows a flowchart in accordance with one or more embodiments of the invention. The steps of the flowchart shown in FIG. 2 may be used to perform multiple defect analyses based on a potential defect definition. Those skilled in the art, having the benefit of this detailed description, will appreciate the order and number of steps shown in FIG. 2 may differ among embodiments of the invention. Further, one or more steps in FIG. 2 may be optional and/or may be performed in any combination of different orders.

In STEP 200, a potential defect definition is obtained. The potential defect definition may be obtained from a repository (e.g., potential defect repository (110) of FIG. 1, discussed above) and/or any storage medium in accordance with one or more embodiments of the invention. The potential defect definition may be used to identify one or more potential defects within source code. Any number of potential defects may be identified based on one or more criteria defined by the potential defect definition. Thus, in one or more embodiments of the invention, the source code may be parsed and analyzed in order to match statements, objects, properties, and/or syntactical elements within the source code to the criteria. If a match is made, a potential defect is determined to exist within the source code.

In one or more embodiments of the invention, after identifying multiple potential defects based on the potential defect definition, a defect analysis is executed for each potential defect (e.g., Defect Analysis Instance 1 (205), Defect Analysis Instance 2 (210), Defect Analysis Instance N (215)). Each defect analysis involves generating a model of the source code (e.g., Model 1 (217), Model 2 (212), Model N (217)) for the corresponding potential defect. By generating a model as a part of each defect analysis, rather than modeling multiple potential defects using a single model, many smaller models may be generated and analyzed. The defect analyses may be executed in parallel, in series, or in any combination thereof in accordance with various embodiments of the invention. The defect analyses may also be ordered by increasing or decreasing cost of analysis (i.e., complexity, resource cost, and/or estimated evaluation time), number of associated program objects, and/or based on the size of an associated program slice extracted from the source code.

Generating an FSM model for a potential defect within source code in accordance with one or more embodiments of the invention is discussed below and in FIGS. 3 and 4. The steps of these flowcharts may be used to identify multiple potential defects for a single potential defect definition and to generate multiple FSM models to analyze the identified potential defects.

Continuing with FIG. 2, in STEP 220, a defect report is generated. The defect report may include results of the defect analyses (e.g., Defect Analysis Instance 1 (205), Defect Analysis Instance 2 (210), Defect Analysis Instance N (215)), including but not limited to a list of real defects (i.e., defects that are verified to exist within the source code), non-defects (i.e., potential defects that are verified to not exist within the source code), and/or remaining potential defects for which the defect analysis was indeterminate. In one or more embodiments of the invention, the defect report includes a running time of each defect analysis, execution status (successful or unsuccessful), and/or any analysis of the performance or results of one or more of the executed defect analyses.

Figure 3:
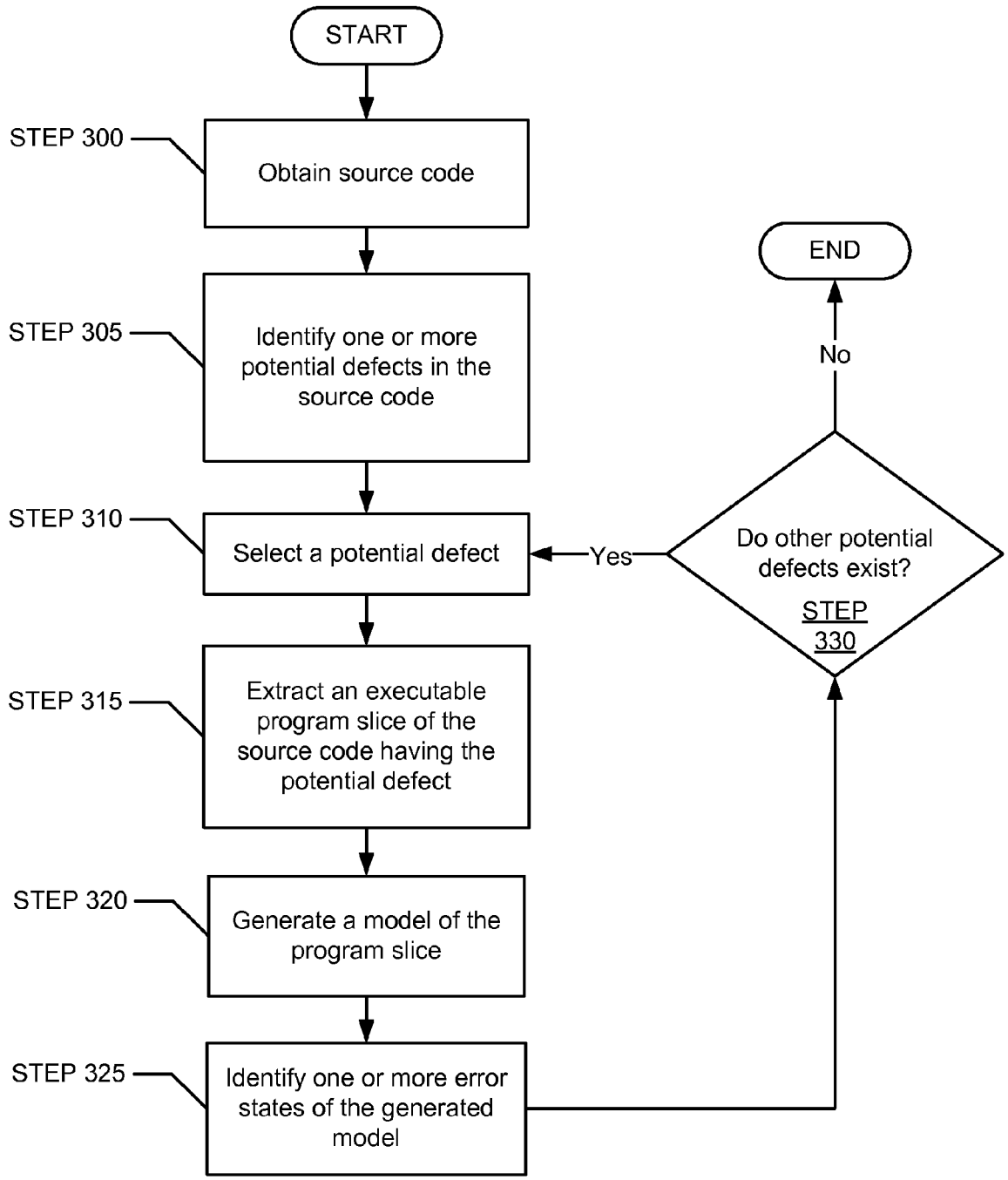

FIG. 3 shows a flowchart in accordance with one or more embodiments of the invention. The steps of the flowchart shown in FIG. 3 may be used to detect defects in source code. Those skilled in the art, having the benefit of this detailed description, will appreciate the order and number of steps shown in FIG. 3 may differ among embodiments of the invention. Further, one or more steps in FIG. 3 may be optional and/or may be performed in any combination of different orders.

In STEP 300, source code is obtained. This may include an entire program or a portion of a program. The source code may be obtained from a user, a software program (e.g., Integrated Development Environment (125) of FIG. 1, discussed above), and/or any other entity. In one or more embodiments of the invention, the source code may be obtained in accordance with a periodic defect analysis routine (e.g., a script performing one or more defect analysis tasks) which obtains a pre-defined list of computer programs and/or portions of one or more computer programs. In one or more embodiments of the invention, the source code is obtained from a concurrent versioning system (CVS) according to an instruction received from the defect analysis routine.

In STEP 305, one or more potential defects are identified within the source code. The potential defects may be identified based on a potential defect definition. In one or more embodiments of the invention, any number of potential defects in a list of potential defects may be identified based on a single potential defect definition. If more than one potential defect is identified, the analyses for the potential defects may be sorted by increasing or decreasing analysis complexity, resource requirement(s), analysis time, and/or any other analysis metric.

In STEP 310, a potential defect is selected for analysis. The potential defect may be selected by a user (e.g., a developer using an IDE) and/or a pre-defined analysis schema. The analysis schema may include selection from an ordered list of potential defects based on cost of analysis and/or sorting scheme. In one example, a user may select sorting criteria from a list of sorting criteria displayed within a graphical user interface of a software application. Sorting criteria may include increasing or decreasing estimated analysis time, resource cost (i.e., number of required resources, resource time requirement, and/or a summation of resource costs, etc.), priority (e.g., user defined priority), size of relevant program slice, memory space requirement, and/or random selection. Thus, in this example, a first potential defect is selected according to the selected analysis schema.

In STEP 315, an executable program slice having the potential defect is extracted from the source code. The program slice may be extracted by iterating (or otherwise traversing) each statement of the source code and adding statements to the program slice as necessary. In one or more embodiments of the invention, the potential defect is identified based on one or more matches made to a search criteria defined by the potential defect definition. The program slice may include only source code capable of producing an occurrence of the potential defect (e.g., based on the potential defect definition). In one or more embodiments of the invention, source code which has no bearing on reproducibility of the potential defect are excluded from the program slice.

In one example, a potential memory leak defect corresponding to a memory allocation is identified. In this example, the program slice is obtained by collecting all statements that (1) are necessary to maintain the executability of the slice, (2) have the potential to modify or free the memory allocation, (3) are return statements, or (4) are control statements that may affect an execution path such that the memory allocation has the potential to be freed/leaked/modified. Thus, in one or more embodiments of the invention, information not necessary for modeling the behavior of the program with respect to the identified potential defect is absent from the program slice.

In one or more embodiments of the invention, STEP 315 may be performed once for any number of analyses corresponding to a single potential defect definition. Thus, the program slice may be stored in a repository and/or memory location and re-used for one or more subsequent analyses in accordance with one or more embodiments of the invention.

In STEP 320 a model of the program slice is created. In one or more embodiments of the invention, the model is an FSM. The model of the program slice may be constructed using both data abstraction and predicate abstraction. Data abstraction may be used to model program variables and/or objects related to a potential defect in the program. One or more control statements may then be modeled, using data abstraction, based upon existing model data for the program variables and/or objects. In one or more embodiments of the invention, it is necessary to know what information will be available to the model when abstracting control statements. Any control statements in the program slice which are not modeled using data abstraction may be modeled using predicate abstraction in accordance with one or more embodiments of the invention.

In one or more embodiments of the invention, a model instruction is created for each source code statement in the program slice. Partial order reduction and/or Counter-Example Guided Abstraction Refinement (CEGAR) techniques may be used in order to mitigate the problem of state explosion (i.e., combinatorial growth of model states resulting in an excessively large and/or unverifiable model). FIG. 4 describes a method of producing a model of the program slice in accordance with one or more embodiments of the invention.

Continuing with FIG. 3, in STEP 325, one or more error states of the model are identified. Thus, the model may represent the possible behaviors of the program slice as related to the specified potential defect. In one or more embodiments of the invention, the data abstraction and predicate abstraction variables and/or model data may represent only a subset of the potential states and/or behavior of the actual source code (i.e., those related to the potential defect). Thus, any states in the model (e.g., an FSM) in which the potential defect is expressed are identified based on the values of the data variables, data control variables, Boolean variables and/or model states/transitions created in one or more embodiments of the invention. In one or more embodiments of the invention, the flowchart proceeds to STEP 330 (or ends) upon identifying an error state. Thus, in order to decrease analysis time, further analysis of the model may be halted after identifying an error state. Although further analysis of the model may lead to the identification of other error states, halting the analysis after identifying the first error state may lead to substantially lower analysis costs in certain applications.

In STEP 330, a determination is made whether one or more remaining potential defects exist. If one or more of the potential defects from STEP 305 remain, the flowchart proceeds back to STEP 310 where another potential defect is selected for analysis. If no other unanalyzed potential defects remain, the process ends.

In one or more embodiments of the invention, one or more analyses of a given potential defect may render one or more subsequent analyses moot, redundant, and/or unverifiable. For example, if a memory leak defect is identified in a first analysis, it may be unnecessary to proceed with further analysis.

Alternatively, in one or more embodiments of the invention, a first analysis of a potential defect may require one or more subsequent analyses to rule out a false positive verification or false negative verification of a potential defect. A false positive verification may refer to an occurrence of a potential defect identified based on a model of a program slice which is false (i.e., the occurrence of the potential defect does not actually exist in the corresponding source code). A false negative identification may refer to an inaccurate assumption and/or conclusion that a given potential defect does not exist in the program slice and/or source code (when in reality it does). A false positive or false negative verification may be caused by incompleteness of the model and/or inaccuracies in abstraction (i.e., the model not exactly matching the program slice and/or source code).

Many abstraction methods, including data abstraction and predicate abstraction, may lead to the production of false positive and false negative identifications. In one or more embodiments of the invention, a layered approach of analysis using a list of overlapping analyses serves to reduce the number of false positive and/or false negative identifications. For example, a first analysis may produce a false positive and/or negative identification which is then ruled out by a second analysis.

Figure 4:
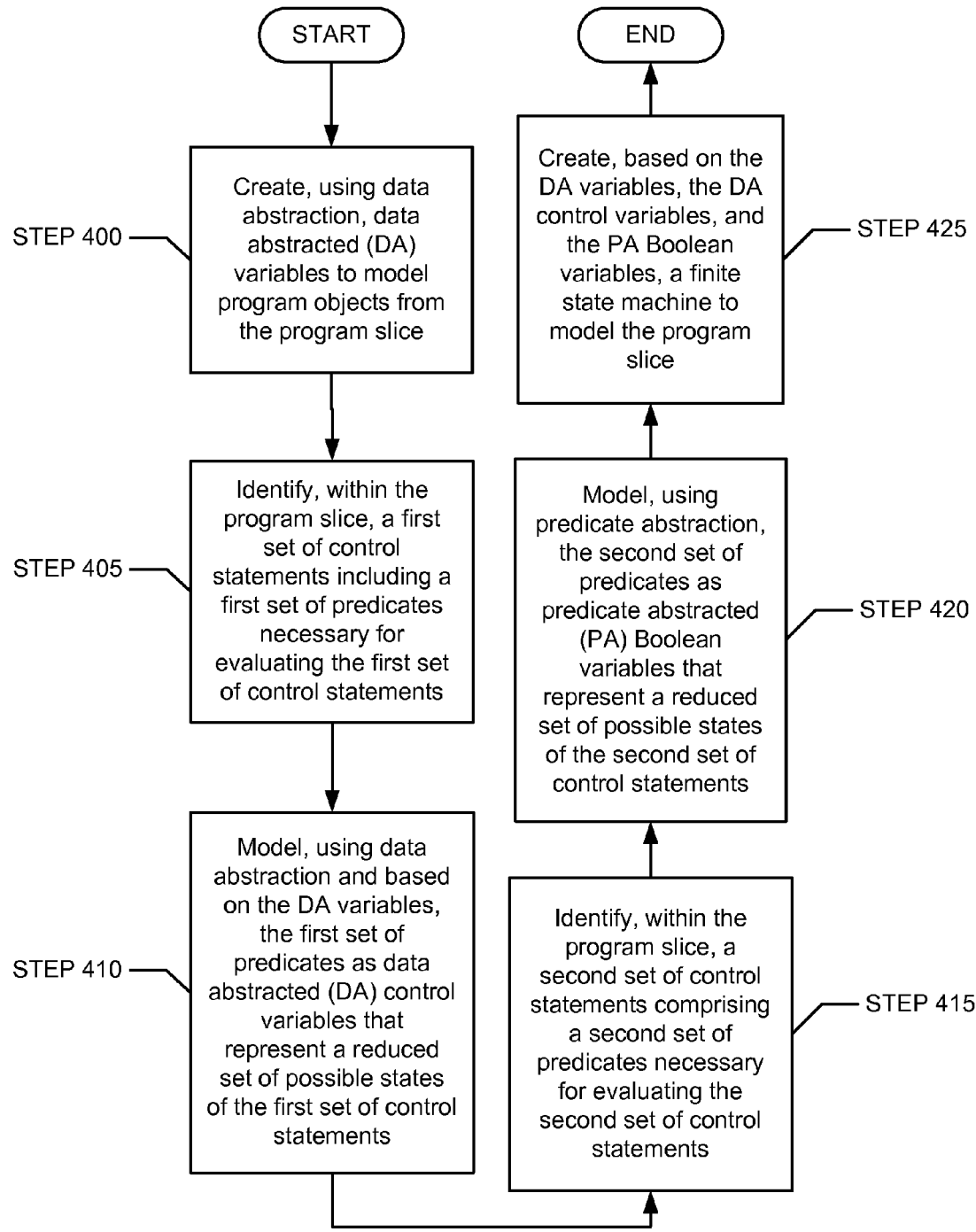

FIG. 4 shows a flowchart in accordance with one or more embodiments of the invention. The steps of the flowchart shown in FIG. 4 may be used to create a finite state machine (FSM) model of a program slice. Those skilled in the art, having the benefit of this detailed description, will appreciate the order and number of steps shown in FIG. 4 may differ among embodiments of the invention. Further, one or more steps in FIG. 4 may be optional.

In STEP 400, one or more data-abstracted variables are created, using data abstraction, to model one or more program objects from the program slice. In one or more embodiments of the invention, the one or more program objects are identified as all program objects within the program slice having at least one usage outside of a control statement. Thus, in one or more embodiments of the invention, data-abstracted variables are used to model program objects which are not present solely within control statements. The one or more program objects may include program objects and/or machine attributes identified by a search criteria of the potential defect definition and/or affecting reproducibility of the potential defect. Machine attributes may include memory, cache, virtual addressing, and/or hardware resources. In one or more embodiments of the invention, the one or more data-abstracted variables are created to store a reduced set of the specific attributes, values, and/or states of the one or more program objects which have the potential to cause, directly or indirectly, an occurrence of the potential defect within the program slice. Thus, data abstraction may involve modeling a reduced set of possible states of the program object. Attributes, values, and/or states which are not relevant to reproducibility of the potential defect may be ignored and/or not included in the model. In one example, for a potential memory leak defect, memory is modeled based solely on its status (e.g., "freed", "escaped", or "allocated"). Thus, the actual contents of allocated memory, which may correspond to a vast number of possible states, are reduced to the model state of "allocated".

In STEP 405, a first set of control statements including a first set of predicates necessary for evaluating the first set of control statements are identified within a program slice. The first set of control statements may be identified by iterating (or otherwise traversing) each source code statement within the program slice and adding control statements to the first set of control statements as they are identified. The first set of control statements may include any statement that has the potential to modify a program object identified by a search criteria of the potential defect definition and/or alter, affect, and/or determine an executable path which is capable of reproducing the potential defect. In one or more embodiments of the invention, the first set of predicates includes any predicate whose evaluation may modify a result of a corresponding control statement.

In STEP 410, the first set of predicates are modeled, using data abstraction and based on the data-abstracted variables, as data-abstracted control variables that represent a reduced set of possible states of the first set of control statements. In one or more embodiments of the invention, any control statement that can be modeled based on data abstracted for the program objects identified in STEP 400 is also modeled (by data abstraction) using said data. Thus, in one or more embodiments of the invention, when it is possible to model the first set of predicates using existing model data (without adding abstraction to the model), data abstraction is used. For example, an object (e.g., char *p) modeled by data abstraction is a parameter of a control statement (e.g., "if (p==NULL)"). This indicates that the control statement may also be modeled using data abstraction. In one or more embodiments of the invention, modeling "without adding abstraction to the model" means each predicate of the first set of predicates can be evaluated using existing model data.

In STEP 415, a second set of control statements including a second set of predicates necessary for evaluating the second set of control statements are identified within the program slice. In one or more embodiments of the invention, the second set of control statements may include any control statement within the program slice that is not capable of being evaluated using the data-abstracted variables (and/or any other existing model data). In one or more embodiments of the invention, the first set of control statements and the second set of control statements are mutually exclusive. In one or more embodiments of the invention, STEP 415 may be performed prior to STEP 410. Control statements identified in STEPS 405 and 415 may refer to any control statement capable of altering and/or selecting an execution path of the program which has potential to produce an occurrence of the potential defect.

In STEP 420, the second set of predicates are modeled, using predicate abstraction, as predicate-abstracted Boolean variables that represent a reduced set of possible states of the second set of control statements. In one or more embodiments of the invention, the second set of control statements could not be modeled using data abstraction without increasing the complexity of the model by modeling new program objects and/or creating additional abstraction. In one or more embodiments of the invention, the first set of control statements and the second set of control statements are transformed into one or more equivalent Boolean statements prior to identifying the first set of predicates and the second set of predicates. This may be done by a theorem prover and/or using any method, algorithm, and/or tool for translating source code statements to equivalent Boolean statements.

In STEP 425, based on the data-abstracted variables, data-abstracted control variables, and the predicate-abstracted Boolean variables, an FSM is created to model the program slice. Each statement in the program slice may contribute one or more transitions and/or states to the FSM such that the final FSM models all possible and/or relevant (i.e., relevant to the potential defect) behavior of the program slice. The FSM model may be expressed in a programming/modeling language, using one or more images, and/or using any method of describing and/or defining an FSM. In one or more embodiments of the invention, when the size of the FSM model exceeds a pre-defined threshold and/or when evaluation time of the model exceeds a given time limit, the modeling process is abandoned and an error message is outputted. In one or more embodiments of the invention, the pre-defined threshold and/or the time limit are received from a user by a graphical user interface of a software application (e.g., integrated development environment 125 of FIG. 1, discussed above).

In accordance with various different embodiments of the invention, one or more of the STEPS of FIG. 4 are optional and may be performed in any combination of different orders (or in parallel). In one example, STEP 420 is performed prior to STEP 410 and STEPS 410 and 420 are performed concurrently thereafter. Thus, all relevant control statement predicates may be identified prior to a concurrent modeling step using predicate and data abstraction. In another example, STEPS 405 and 415 are performed prior to STEP 400 such that all subsequent modeling steps occur concurrently.

In one example, the following algorithm, written in pseudocode, describes a method of defect analysis in accordance with one or more embodiments of the invention:

```
1   DefectSpecificModelCheck(program){
2       potentialDefects = GetPotentialDefectsList(program);
3       defects = { };
4       for each pd in potentialDefects{
5           programSlice = SliceProgram(program, pd);
6           if (programSlice is not empty){
7               model = GenerateDefectSpecificModel(programSlice, pd);
8               if (model is not empty){
9                   result = ModelCheck(model, fixedProperty);
10                  if (result is unsafe)
11                      defects = defects U {pd};
12              }
13          }
14      }//for
15      return defects
16  }
17
18  GenerateDefectSpecificModel(programSlice, pd){
19      boolVariables = { };
20      dataVariables = { };
21      predicates = GetControlStatementPredicates( programSlice );
22      for each pred in predicates {
23          if (pred cannot be expressed using DataAbstraction) {
24              boolVar = new BoolVariableFor(pred);
25              boolVariables = boolVariables   {boolVar}
26          }
27      }
28      model = <>
29      for each statement in programSlice{
30          modelInst = ApplyDefectSpecificAbstraction(statement, pd,
31                          boolVariables, dataVariables);
32          if(modelInst is empty)
33              return empty
34          else
35              model = model ^ <modelInst>
36      }
37      return model;
38  }
```

In this pseudocode example, "DefectSpecificModelCheck" (line 1) represents a function receiving source code as input. The function "GetPotentialDefectsList" (line 2) identifies a list of potential defects based on a library of potential defect definitions and an analysis of the program. Lines 4 to 14 represent a loop which iterates through the potential defects (i.e., "potentialDefects") and extracts a program slice (i.e., "programSlice") for each potential defect and passes the program slice to the function "GenerateDefectSpecificModel" (line 18). The return value of this function is a model of the program slice which is subsequently passed into the function "ModelCheck" (line 9). This function checks the model for error states and returns a result variable. If an error state is identified, an object representing the identified potential defect (i.e., "pd") is added to a list of real defects ("defects") and the loop continues.

Continuing with the example, "GenerateDefectSpecificModel" (line 18) represents a function receiving a program slice (i.e., "programSlice") and the object representing the identified potential defect (i.e., "pd") as input. The function "GetControlStatementPredicates" (line 21) extracts a set of control statement predicates (i.e.,"predicates") from the program slice. For each predicate (i.e., "pred"), if the predicate cannot be expressed using data abstraction, a new predicate-abstracted Boolean variable (i.e., "boolVar") is created to model the predicate. Next, for each statement in the program slice, the function "ApplyDefectSpecificAbstraction" (line 30) generates one or more model states of an FSM model and/or one or more data-abstracted variables to model the statement (including one or more predicates corresponding to one or more control statements). The FSM is constructed in this way and then passed back to the calling function as a return value.

Figure 5:
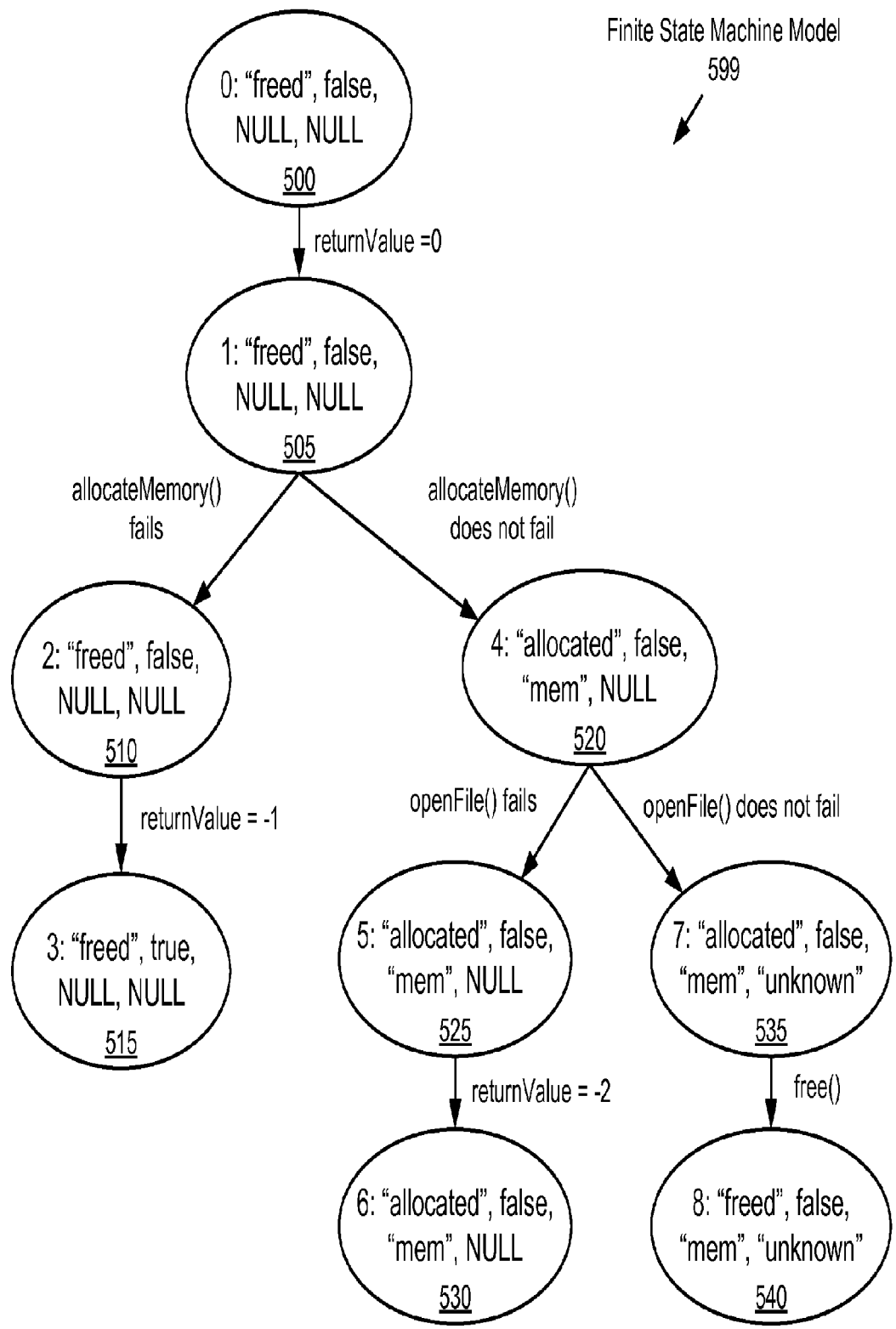
FIG. 5 depicts an example of a finite state machine model for a potential memory leak defect within a program slice in accordance with one or more embodiments of the invention.

Referring to FIG. 5, the following example program slice, written in pseudocode, is analyzed for defects:

```
1     function foo( )
2     {
3         variable returnValue = noErrorsDetected;
4         pointer p = allocateMemory(128);
5         if (p is NOT allocated) {
6             returnValue = error1Detected;
7             jump to statement labeled "end";
8         }
9
10        File f = openFile( "test.c");
11        if (f was NOT opened successfully) {
12            return Value = error2Detected;
13            jump to statement labeled "end";
14        }
15
16        closeFile(f);
17        deallocateMemory(p);
18
19    end:
20        if (return Value == error1Detected) {
21            if (p is allocated) {
22                deallocateMemory(p);
23            }
24        }
25        return returnValue;
26    }
```

For purposes of this example, although the example is written in pseudocode, the original source code and the program slice are both assumed executable and are assumed to be syntactically correct (i.e., can be compiled/interpreted successfully by a compiler/interpreter). In this example, for the given program slice, an analysis for a potential memory leak defect is executed. During the analysis, the search criteria of the potential defect definition identifies any statement which allocates memory. The program slice was obtained from an original source code as follows: given a statement that allocates memory (line 4, above) and a statement that may leak memory (such as the return statement in line 25, above), the statements that are data-dependent on the allocated pointer were obtained. Any dependent control statements preceding the return and their data dependences were also obtained.

Continuing the example, the program slice is abstracted into a finite-state machine model represented by finite state machine model (599) of FIG. 5. This model should provide enough information to determine whether the allocated memory leaks or not. Consequently, the states of this model consist of the abstract values of the memory in question, relevant pointers and control predicates. Each state of the finite state machine model (599) is represented by the set of values "{MemoryStatus, b, p, f}", where "p", and "1" are program objects defined in the program slice above and "b" represents a predicate-abstracted Boolean variable corresponding to a control statement (described below). Data abstraction is used to represent the memory and the value of the pointers as data variables. The memory is represented by its status ("freed", "escaped" or "allocated") and pointers are abstracted as three values: virtual address, offset, and indirect references. Virtual addresses can be the memory allocation in question, NULL or "unknown". Indirect references identify pointers contained in the referenced memory. Predicate abstraction is used to represent control statements when data abstraction cannot be used. For example, for the potential memory leak at line 25 in the program slice above, we identify "p", "1" and "returnValue" as relevant variables, wherein "p" and "1" are represented by data abstraction, and the control statement at line 11 is represented by data abstraction rather than predicate abstraction. On the other hand, "returnValue" is expressed using predicate abstraction to keep track of the value of the predicate {returnValue==-1} at line 20. Here, predicate abstraction is used because the existing data-abstracted variables do not have the necessary information to determine the behavior of the control statement (i.e., calculate the value of returnValue).

As a result, states of the example finite state machine model are represented by eight values: the memory status, a predicate-abstracted Boolean variable "b" corresponding to the predicate {returnValue==-1}, and virtual address, offset, and indirect reference values for both pointers "p" and "1". For convenience, only the virtual address of the pointers are shown in the states (500, 505, 510, 515, 520, 525, 530, 535, 540) of FIG. 5.

The start state of the example finite state machine model (599) corresponds to the latest statement in the program slice that can reach both the allocation and the return. State transitions are created for each statement in the program slice by modifying the abstract values of the memory, pointers or the control predicates accordingly. Memory statements, such as "allocateMemory", alter the state of the memory and involved pointers.

Following the example, FIG. 5 shows how the allocateMemory statement (line 4 of the example pseudocode, above) generates two transitions from state 1 (505). It is chosen non-deterministically whether allocateMemory fails or not. The first is represented as the transition to state 2 (510) where the memory status is kept "freed" and the virtual address of "p" is NULL. Successful memory allocation is expressed in state 4 (520) where the memory status changes to "allocated" and the virtual address, offset and indirect reference of "p" changes to "mem", 0, and NULL respectively.

In the case of statements affecting the control predicates, the new value of the respective Boolean variable is evaluated. For instance, the assignment at line 6 of the example makes the predicate "{returnValue==-1}" evaluate to "true" as it is represented in the model by the transition between states 2 and 3. On the other hand, control statements constrain the transitions (statements) that can be applied on a state. For example, line 12 in the example can potentially be executed in state 5 or 7, however it is only applied in state 5 because the virtual address of "f" points to NULL only in this state. States 3 (515), 6, (530) and 8 (540) of FIG. 5 represent the end states of the finite state machine model.

Continuing the example, the finite state machine model is then be passed to a standard model checker (e.g., model checker (115) of FIG. 1, discussed above) to verify that no end state(s) exist in which the abstract value of the memory is "allocated". If the model checker finds such a state (i.e., a counter-example), a memory leak is reported. In this example, the model checker reports a memory leak, as the memory status is "allocated" in end state 6 (530). In other words, end state 6 (530) indicates that an occurrence of the potential memory leak exists when "allocateMemory" does not fail and "openFile" fails.

Figure 6:
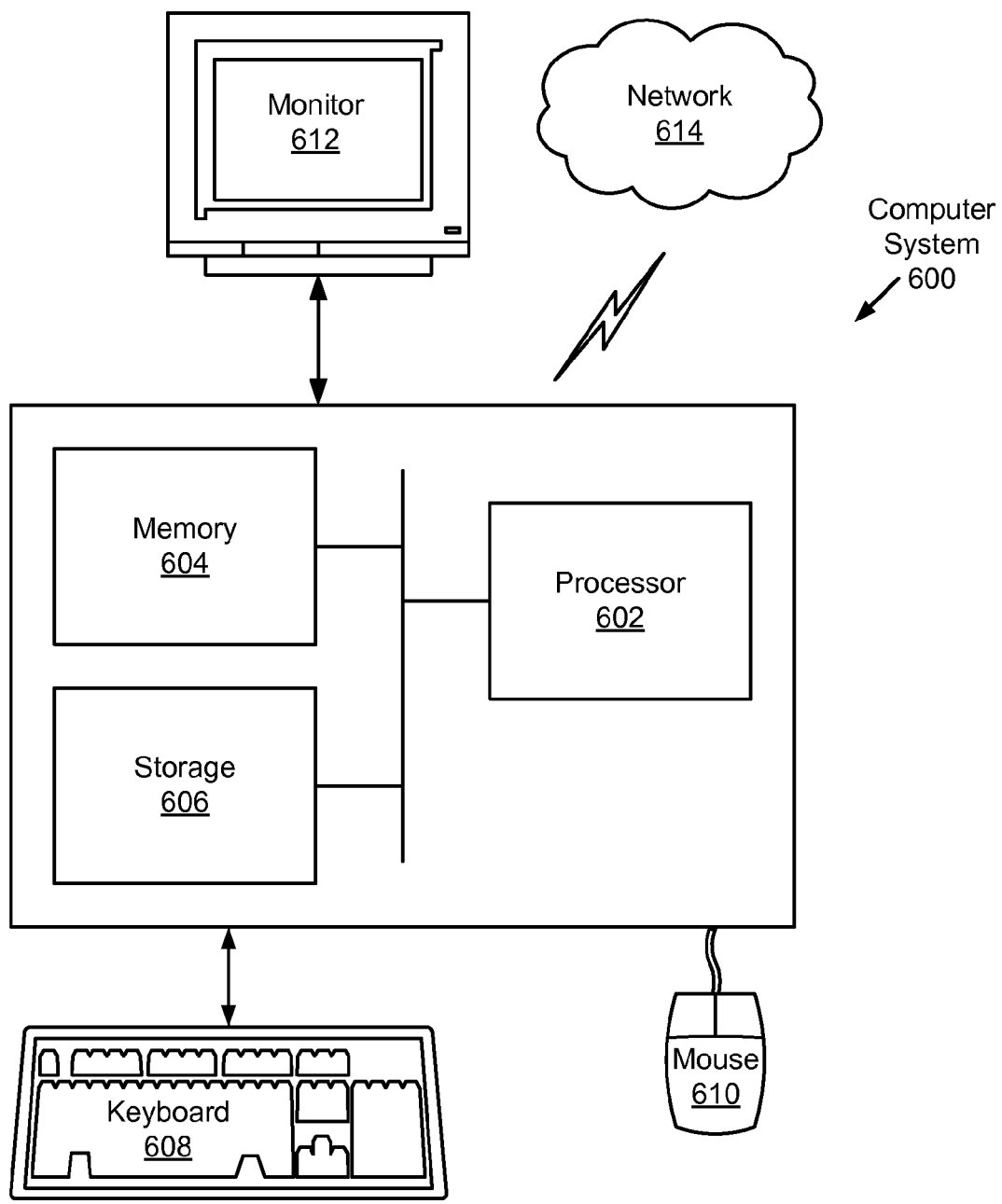
FIG. 6 depicts a computer system in accordance with one or more embodiments of the invention.

Embodiments of the invention may be implemented on virtually any type of computer regardless of the platform being used. For example, as shown in FIG. 6, a computer system (600) includes one or more processor(s) (602) (such as a central processing unit (CPU), integrated circuit, hardware processor, etc.), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention (e.g., defect analysis tool (100), model generator (105), potential defect repository (110), model checker (115), etc. in FIG. 1) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By generating multiple smaller models, each corresponding to a single potential defect, large code bases can be verified with a lower number of total model states and/or verification operations. The use of multiple smaller models may lead to increased scalability and decreased analysis complexity, in one or more embodiments of the invention.

One or more embodiments of the invention have one or more of the following advantages. By extracting and analyzing only an executable program slice (i.e., a subset) of a given source code, it is possible to test for potential defects corresponding to specific program objects and/or properties versus traditional model checking techniques which are directed to generic types of defects applicable to the source code as a whole.

One or more embodiments of the invention have one or more of the following advantages. By using both data abstraction and predicate abstraction in generating a single FSM model, advantages of each technique can be exploited. The relatively low computational cost of data abstraction coupled with the relative accuracy of predicate abstraction may lead to decreased computational cost and increased accuracy of the FSM model.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting defects in a computer program, comprising:
    obtaining, by a processor, a plurality of source code and a potential defect definition;
    identifying, based on the potential defect definition, a plurality of program objects associated with a potential defect in the plurality of source code;
    extracting an executable program slice having the potential defect from the plurality of source code;
    generating, by a processor, an abstracted model of the program slice by:
        modeling, using data abstraction, the plurality of program objects as a plurality of data-abstracted variables that represent a reduced set of possible states of the plurality of program objects,
        identifying, within the program slice, a first plurality of control statements comprising a first plurality of predicates necessary for evaluating the first plurality of control statements,
        modeling, using predicate abstraction, the plurality of predicates as a plurality of predicate-abstracted Boolean variables that represent a reduced set of possible states of the first plurality of control statements, and
        creating, based on the plurality of data-abstracted variables and the plurality of predicate-abstracted Boolean variables, a finite state machine (FSM) model of the program slice by:
            creating, based on a type of the potential defect, a virtual memory address comprising a virtual status in order to model at least one of the plurality of program objects;
            identifying, using data abstraction, a set of virtual memory statuses that represent a reduced set of possible states of the virtual memory address; and
            tracking a value of the virtual status for each state of the FSM, wherein the value of the virtual status is selected from the set of virtual memory statuses; and
    identifying an error state of the FSM indicating an occurrence of the potential defect within the program slice.

2. The method of claim 1, further comprising:
    identifying, within the program slice, a second plurality of control statements comprising a second plurality of predicates necessary for evaluating the second plurality of control statements, wherein the first plurality of control statements and the second plurality of control statements are mutually exclusive; and modeling, using data abstraction and based solely upon the plurality of data-abstracted variables and the second plurality of control statements, the second plurality of predicates as a plurality of data-abstracted control variables that represent a reduced set of possible states of the second plurality of control statements, wherein the FSM is further based on the plurality of data-abstracted control variables.

3. The method of claim 1, wherein creating the FSM to model the program slice comprises:
identifying, within the program slice, a plurality of statements modifying the plurality of data-abstracted variables and the plurality of predicate-abstracted Boolean variables;
creating a state of the FSM for each of the plurality of statements; and
creating, based on a plurality of execution paths of the program slice, a transition of the FSM connecting each state of the FSM to at least one other state of the FSM.

4. The method of claim 1, wherein identifying the error state of the FSM comprises:
identifying a plurality of end states of the FSM;
identifying, within an end state of the plurality of end states, a value of a data-abstracted variable of the plurality of data-abstracted variables that indicates the occurrence of the potential defect; and
flagging the end state as the error state.

5. The method of claim 1, wherein the program slice comprises the plurality of program objects, and wherein each of a plurality of statements within the program slice modifies a state of a program object of the plurality of program objects.

6. The method of claim 1, wherein the potential defect is one selected from a group consisting of an arithmetic defect and a multi-threading defect.

7. The method of claim 1, wherein the potential defect is a memory leak associated with an instance of memory allocation in the plurality of source code, and wherein the plurality of program objects comprises a pointer to the instance of memory allocation.

8. A non-transitory computer-readable storage medium storing a plurality of instructions for detecting defects in a computer program, the plurality of instructions comprising functionality to:
obtain a plurality of source code and a potential defect definition;
identify, based on the potential defect definition, a plurality of program objects associated with a potential defect in the plurality of source code;
extract an executable program slice having the potential defect from the plurality of source code;
generate an abstracted model of the program slice by:
modeling, using data abstraction, the plurality of program objects as a plurality of data-abstracted variables that represent a reduced set of possible states of the plurality of program objects,
identifying, within the program slice, a first plurality of control statements comprising a first plurality of predicates necessary for evaluating the first plurality of control statements,
modeling, using predicate abstraction, the plurality of predicates as a plurality of predicate-abstracted Boolean variables that represent a reduced set of possible states of the first plurality of control statements, and creating, based on the plurality of data-abstracted variables and the plurality of predicate-abstracted Boolean variables, a finite state machine (FSM) model of the program slice by:
creating, based on a type of the potential defect, a virtual memory address comprising a virtual status in order to model at least one of the plurality of program objects;
identifying, using data abstraction, a set of virtual memory statuses that represent a reduced set of possible states of the virtual memory address; and
tracking a value of the virtual status for each state of the FSM, wherein the value of the virtual status is selected from the set of virtual memory statuses; and
identify an error state of the FSM indicating an occurrence of the potential defect within the program slice.

9. The non-transitory computer-readable storage medium of claim 8, wherein the plurality of instructions further comprise functionality to:
identify, within the program slice, a second plurality of control statements comprising a second plurality of predicates necessary for evaluating the second plurality of control statements, wherein the first plurality of control statements and the second plurality of control statements are mutually exclusive; and
model, using data abstraction and based solely upon the plurality of data-abstracted variables and the second plurality of control statements, the second plurality of predicates as a plurality of data-abstracted control variables that represent a reduced set of possible states of the second plurality of control statements, wherein the FSM is further based on the plurality of data-abstracted control variables.

10. The non-transitory computer-readable storage medium of claim 8, wherein creating the FSM to model the program slice comprises:
identifying, within the program slice, a plurality of statements modifying the plurality of data-abstracted variables and the plurality of predicate-abstracted Boolean variables;
creating a state of the FSM for each of the plurality of statements; and
creating, based on a plurality of execution paths of the program slice, a transition of the FSM connecting each state of the FSM to at least one other state of the FSM.

11. The non-transitory computer-readable storage medium of claim 8, wherein identifying the error state of the FSM comprises:
identifying a plurality of end states of the FSM;
identifying, within an end state of the plurality of end states, a value of a data-abstracted variable of the plurality of data-abstracted variables that indicates the occurrence of the potential defect; and
flagging the end state as the error state.

12. The non-transitory computer-readable storage medium of claim 8, wherein the program slice comprises the plurality of program objects, and wherein each of a plurality of statements within the program slice modifies a state of a program object of the plurality of program objects.

13. The non-transitory computer-readable storage medium of claim 8, wherein the potential defect is one selected from a group consisting of an arithmetic defect and a multi-threading defect.

14. The non-transitory computer-readable storage medium of claim 8, wherein the potential defect is a memory leak associated with an instance of memory allocation in the plurality of source code, and wherein the plurality of program objects comprises a pointer to the instance of memory allocation.

15. A system for detecting defects in a computer program, comprising:
    a processor;
    a defect analysis tool executing on the processor and configured to:
        obtain a plurality of source code and a potential defect definition,
        identify, based on the potential defect definition, a plurality of program objects associated with a potential defect in the plurality of source code;
        extract an executable program slice having the potential defect from the plurality of source code;
    a model generator executing on the processor and configured to generate an abstracted model of the program slice by:
        modeling, using data abstraction, the plurality of program objects as a plurality of data-abstracted variables that represent a reduced set of possible states of the plurality of program objects,
        identifying, within the program slice, a first plurality of control statements comprising a first plurality of predicates necessary for evaluating the first plurality of control statements,
        modeling, using predicate abstraction, the plurality of predicates as a plurality of predicate-abstracted Boolean variables that represent a reduced set of possible states of the first plurality of control statements, and
        creating, based on the plurality of data-abstracted variables and the plurality of predicate-abstracted Boolean variables, a finite state machine (FSM) model of the program slice by:
            creating, based on a type of the potential defect, a virtual memory address comprising a virtual status in order to model at least one of the plurality of program objects;
            identifying, using data abstraction, a set of virtual memory statuses that represent a reduced set of possible states of the virtual memory address; and
            tracking a value of the virtual status for each state of the FSM, wherein the value of the virtual status is selected from the set of virtual memory statuses; and
    a model checker executing on the processor and configured to:
        identify an error state of the FSM indicating an occurrence of the potential defect within the program slice.

16. The system of claim 15, wherein the model generator is further configured to generate the abstracted model of the program slice by:
    identifying, within the program slice, a second plurality of control statements comprising a second plurality of predicates necessary for evaluating the second plurality of control statements, wherein the first plurality of control statements and the second plurality of control statements are mutually exclusive; and
    modeling, using data abstraction and based solely upon the plurality of data-abstracted variables and the second plurality of control statements, the second plurality of predicates as a plurality of data-abstracted control variables that represent a reduced set of possible states of the second plurality of control statements, wherein the FSM is further based on the plurality of data-abstracted control variables.

17. The system of claim 15, wherein creating the FSM to model the program slice comprises:
    identifying, within the program slice, a plurality of statements modifying the plurality of data-abstracted variables and the plurality of predicate-abstracted Boolean variables;
    creating a state of the FSM for each of the plurality of statements; and
    creating, based on a plurality of execution paths of the program slice, a transition of the FSM connecting each state of the FSM to at least one other state of the FSM.

* * * * *